United States Patent
Dreano

(10) Patent No.: US 6,401,959 B1
(45) Date of Patent: Jun. 11, 2002

(54) RIGID STRUCTURE, IN PARTICULAR, A STRUCTURE CONSTITUTING IMPLEMENTS FOR THE INDUSTRIAL COOKING OF FOODS

(75) Inventor: Claude Dreano, Mauron (FR)

(73) Assignee: Armor Inox, Mauron (FR)

( * ) Notice: Subject to any disclaimer, the term of this patent is extended or adjusted under 35 U.S.C. 154(b) by 0 days.

(21) Appl. No.: 09/492,798

(22) Filed: Jan. 28, 2000

(30) Foreign Application Priority Data

Feb. 2, 1999 (FR) .............................................. 99 01150

(51) Int. Cl.[7] .............................................. B65D 25/24
(52) U.S. Cl. ..................... 220/476; 220/573.1; 248/146
(58) Field of Search .............................. 220/573.1, 475, 220/482, 476; 248/146, 151, 314, 315, 310; 99/349, 350, 448, 426

(56) References Cited

U.S. PATENT DOCUMENTS

| | | | | |
|---|---|---|---|---|
| 1,946,149 A | * | 2/1934 | Churchill | 205/201 |
| 1,983,060 A | * | 12/1934 | Zuckerman | 248/225.11 |
| 3,025,122 A | * | 3/1962 | Millman | 312/245 |
| 3,282,460 A | * | 11/1966 | Boznango | 220/486 |
| 4,492,215 A | * | 1/1985 | DiGianvittorio | 126/9 R |
| 5,572,924 A | * | 11/1996 | Crnjanski | 99/426 |
| 5,650,085 A | * | 7/1997 | Chen | 219/732 |
| 5,860,358 A | * | 1/1999 | Shriver | 99/426 |

* cited by examiner

*Primary Examiner*—Mickey Yu
*Assistant Examiner*—Troy Arnold
(74) *Attorney, Agent, or Firm*—Dennison, Scheiner & Schultz

(57) ABSTRACT

A rigid support structure comprising a plurality of beams having slots, a plurality of holding elements having a plurality of tabs extending therefrom, each of the tabs including a slot complementary to said slots in said beams, said holding elements being mounted on said beams with said tab slots engaging said beam slots; wherein two tabs are received in at least one of said beam slots.

2 Claims, 6 Drawing Sheets

RIGID STRUCTURE, IN PARTICULAR, A STRUCTURE CONSTITUTING IMPLEMENTS FOR THE INDUSTRIAL COOKING OF FOODS

This invention relates to a rigid structure, in particular, a structure constituting a tool for the industrial cooking of foods, such as hams, as well as a process for assembling such a structure.

One usually places hams to be cooked, regardless of whether or not they are packaged in plastic pouches, in stackable cooking implements that comprise a number of receptacles ensuring that the hams will be held in position during the cooking process, while stacking the utensils and putting the stack of utensils stocked with hams to be cooked in a cooking cell into which one introduces a calorie-bearing fluid. However, it is not easy to assembly a plurality of receptacles in a rigid structure which is capable of withstanding major stresses such as those engendered by the bulk of the hams placed in these receptacles.

It is therefore an object of this invention to offer a rigid structure comprising a plurality of receptacles, in particular, individual receptacles for the cooking of hams.

It is also an object of this invention to offer such a structure that will be easy to handle, in particular to stack.

It is also an object of this invention to offer a number of perfectly identical stackable cooking utensils, with negligible geometric variations.

It is also an object of this invention to offer an industrial cooking utensil that can be obtained at a moderate price.

It is also an object of this invention to offer a process for the assembly of elements to constitute a rigid structure.

According to this invention, the assembled elements are provided with at least one tab or tongue comprising an assembly slot or groove, while a transversal plate or beam comprises slots or grooves that complement a plurality of such tabs or tongues, each equipped with an assembly slot or groove. Each slot of the transversal plate or beam is arranged opposite said assembly slots and has a width that is equal to or approximately equal to the sum of the thicknesses of the plates or tongues augmented by the leeway necessary for their introduction with a view to the assembly of a number of elements in each slot.

Advantageously, the structure according to this invention comprises a plurality of transversal plates or beams, each comprising a plurality of slots that receive one or preferably several groups of tabs or tongues.

Advantageously, each of the elements of the structure is retained with the help of at least two tabs or tongues.

Advantageously, the elements of the structure according to this invention comprise tabs or tongues that protrude with respect to two of their opposite faces, making it possible to retain each element by means of two consecutive transversal plates or beams.

Additionally, the individual elements of the structure according to the invention can be assembled in the form of a rigid module where the tabs or tongues, equipped with assembly slots, extend beyond the module, preferably on its two opposite faces, so as to permit their assembly with transversal plates or beams.

This invention is primarily intended to provide a rigid structure comprising a plurality of elements assembled by means of tabs or tongues with a transversal beam or plate with respect to said tabs or tongues, characterized in that the tabs or tongues comprise first assembly slots, in that the transversal beam or plate has a second slot that is complementary to the first assembly slots of said tabs or tongues and in that a plurality of tabs or tongues is housed on the level of their first assembly slots in a second slot of the transversal beam or plate.

The object of this invention also includes a rigid structure, characterized in that elements which are assembled by means of a second slot made in the transversal beam or plate are arranged on either side of said transversal beam or plate, preferably facing them.

This invention also includes a rigid structure, characterized in that two elements, assembled by housing their tabs or tongues in one and the same slot of a transversal beam or plate, are arranged on the same side of said transversal beam or plate.

The object of this invention also is to provide a rigid structure, characterized in that the assembled elements comprise at least a first tab that protrudes with respect to a first face and a second tab or tongue that protrudes with respect to a second face opposite said first face of the element.

The object of this invention also includes a rigid structure, characterized in that it comprises means for grouping a plurality of elements in the form of a module and in that the tabs or tongues of the various elements of the module extend beyond the module so as to permit the housing of their slots in the corresponding slots of a transversal beam or plate.

This invention is also intended to provide a rigid structure, characterized in that said structure is an industrial tool for the cooking of ham.

The object of this invention also is to provide a rigid structure, characterized in that the elements are individual receptacles for the cooking of hams, in particular, in the shape of an isosceles trapezium with rounded angles.

This invention also is intended to provide a rigid structure, characterized in that it is symmetrical with respect to two perpendicular planes.

This invention also is intended to provide a rigid structure, characterized in that said structure can be stacked and in that it comprises feet permitting the passage of the forks of a handling machine under the lower structure of a stack of stacked-up structures.

This invention also relates to a rigid structure, characterized in that it comprises, under each receptacle for the reception of a ham, a lid that provides for the confinement and/or pressing of hams that are in the immediately lower receptacle.

The object of this invention also includes a process for the assembly of a rigid structure, characterized in that it comprises stages involving the housing in a slot of a transversal beam or plate of at least two complementary slots made in the tabs or tongues that are integral with at least two elements to be assembled.

This invention will be better understood with the help of the description being given below and the attached figures given by way of nonrestrictive examples:

In FIGS. 1 to 15, we used the same references to designate the same elements.

In the symbolic diagrams in FIGS. 1 to 5, the tabs, arranged in one and the same slot, are—for reasons of clarity—illustrated such that each is a small distance from the other so as to illustrate their relative positions.

Figure 1:
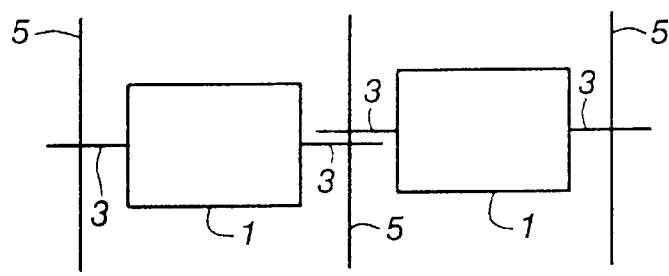
FIG. 1 is a diagram showing a plan view of a first example of the implementation of a structure according this invention.

In FIG. 1, one can see a first example of the implementation of a structure according to this invention comprising two elements 1 that are advantageously identical, each being equipped, at least on one of its faces, with a tab or tongue 3. In the nonrestrictive example illustrated, elements 1 are receptacles with a rectangular base, tabs 3 are integral on the level of their vertical walls constituting the small sides of elements 1. Tabs 3 are equipped with assembly slots extending, for example, over approximately half of the height of tab 3.

A transversal plate or beam 5, arranged perpendicularly to tabs or tongues 3, comprises a slot that is complementary to the assembly slots made in tabs or tongues 3. Thus, the opening of the slot is arranged opposite the opening of the assembly slots made in tabs or tongues 3, and its depth is preferably equal to approximately half of the height of tabs or tongues 3. The width of the slot made in transversal beam or plate 5 makes it possible by force, with little or no leeway, to introduce two tabs or tongues 3 arranged parallel on the level of their assembly slot. Typically, the width of the slot made in transversal beam or plate 5 is slightly greater than the sum of the thicknesses of tongues 3 to be assembled.

In the example illustrated in FIG. 1, the two elements 1 are facing each other on either side of transversal beam or plate 5.

It is, of course, understood that this invention is not confined to the use of a transversal beam or plate 5 that is unique by virtue of its structure. In the example illustrated, the structure comprises a plurality of parallel and consecutive beams or plates 5. In order to assemble in a linear pattern a number of elements 1 that would be in excess of 2, one uses intermediate transversal beams or plates 5 similar to the middle plate in the structure shown in FIG. 1. The structure can be terminated by end plates equipped with slots that are complementary to an assembly slot of a single tab 3. In other words, the slots of end plates 5 have a width that is essentially equal to or slightly greater than the thickness of a tab or tongue 3. Likewise, one can arrange a plurality of lines of elements 1 parallel to each other; each transversal beam or plate 5 that is used here would comprise slots that are preferably regularly distributed over all or part of its length. Thus, returning to the image shown in FIG. 1, one can put together a matrix structure comprising a plurality of lines of elements 1, each line comprising a plurality of assembled elements 1. The structure is very rigid in and of itself; it can, however, be complemented by reinforcing elements such as a peripheral framework (not shown in the figure). This invention thus makes it possible to put together structures whose thickness is small in comparison to their surface while offering excellent resistance to deformation.

It is, of course, understood that this invention is not limited to the assembly of elements 1 arranged on either side of a transversal beam or plate 5. In the example illustrated in FIG. 2, two elements 1 are arranged parallel to each other, their tabs or tongues 3 being folded back to be able to be arranged in a slot of plate or beam 5 situated, for example, in the median plane between the two elements 1. In the example illustrated, each tab or tongue 3 is Z-shaped and has two right angles pointing in opposite directions. In the example illustrated in FIG. 2, the two elements 1 are assembled by means of two consecutive transversal beams or plates 5.

It is, of course, understood that this invention is not limited to an assembly of tabs or tongues 3 in one and the same slot of a transversal beam or plate 5. In the example illustrated in FIG. 3, we assembled three elements 1 according to this invention. Central element 1 comprises straight tabs or tongues 3 similar to those illustrated in FIG. 1. The two elements 1 at the ends are equipped with tabs or tongues 3, having the shape of a Z, similar to those illustrated in FIG. 2, although their lateral shift creates sufficient space for the reception of central element 1.

Figure 4:
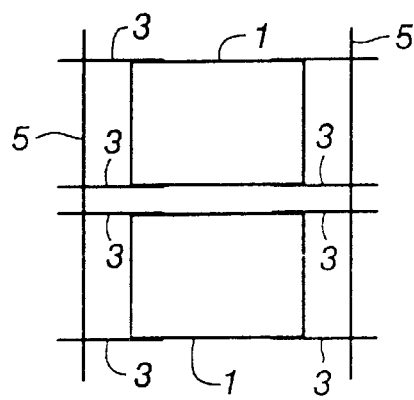
FIG. 4 is a diagram showing a plan view of a fourth example of the implementation of a structure according to this invention.

In the example illustrated in FIG. 4, each element 1 is equipped with two tabs or tongues 3 at each of its two elements. For instance, tabs or tongues 3 are integral with the vertical walls of each of the long sides of element 1 and, toward the outside, are arranged in the prolongation of these walls.

For example, in the case of a metallic construction, tabs 3 constitute sheets that are soldered over a certain length of the walls forming the long sides of element 1.

As a variant, a single plate, integral over the entire length of element 1, extends beyond the two sides and forms two opposite tabs 3. A similar sheet is arranged on the long side opposite element 1.

Likewise, without going beyond the scope of this invention, the long sides of element 1 can be made up of a sheet whose ends, protruding beyond the short side of element 1, comprise assembly slots and act as tabs or tongues 3. In this case, the short side is assembled, for example, by soldering on the sheets constituting the long side and assembly tabs 3.

However, it is understood that this invention is not confined to the attachment of tabs 3 in the prolongation of the long side of element 1 nor is it confined to the use of elements having the shape of a rectangular parallelepiped. On the contrary, the structure according to this invention makes it possible to assemble elements 1 that can have any desired shape.

Two elements 1 in FIG. 4 are advantageously arranged, side by side, joined together. Thus, one and the same slot, made in a transversal beam or plate 5, can receive the slots of tabs or tongues 3 of two consecutive elements 1.

Figure 2:
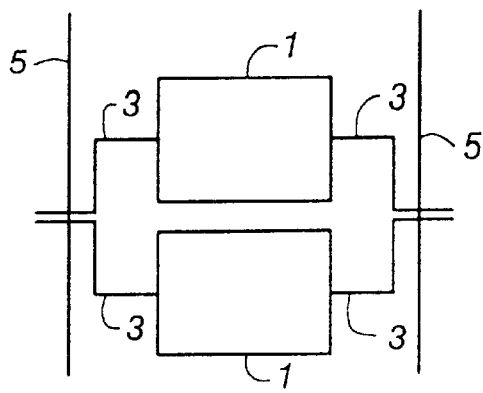
FIG. 2 is a diagram showing a plan view of a second example of the implementation of a structure according to this invention.
Figure 3:
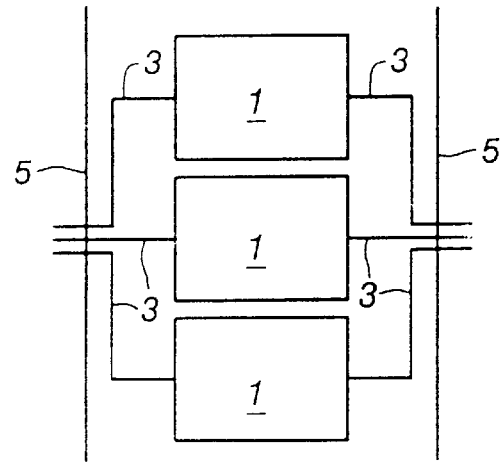
FIG. 3 is a diagram showing a plan view of a third example of the implementation of a structure according to this invention.
Figure 5:
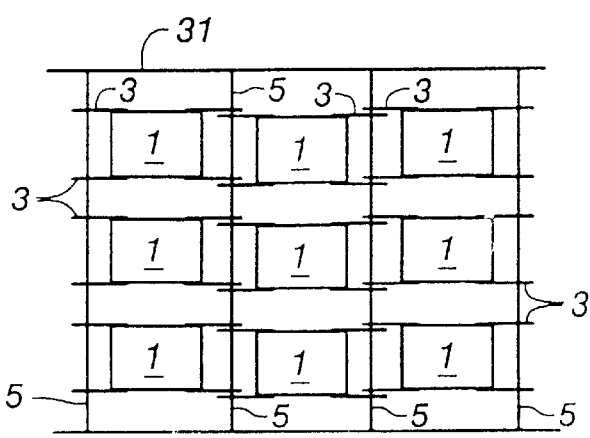
FIG. 5 is a diagram showing a plan view of a fifth example of the implementation of a structure according to this invention.

It is, of course, understood that in the case of structure 1, the arrangement illustrated in FIGS. 2, 3 and 4 can be repeated in terms of width and depth so as to form a structure having the desired surface and number of elements 1.

It is, of course, understood that the modes of assembly shown in FIGS. 1 to 4 can be combined. For example, in FIG. 5, we illustrated the combination of the assembly mode in FIG. 4 (tab or tongue 3 situated in the prolongation of the long side of elements 1) with the mode of assembly illustrated in FIG. 1 (assembly of elements 1 arranged opposite and on either side of a transversal beam or plate 5).

Figure 6:
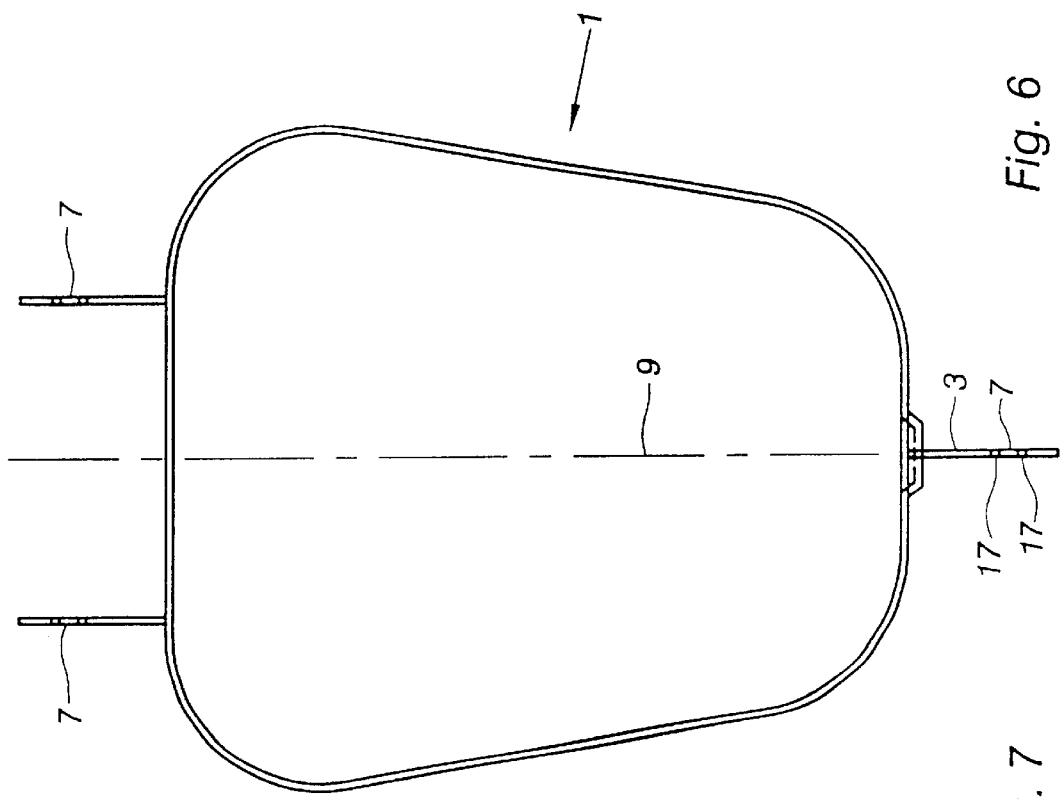
FIG. 6 is a diagram showing a plan view of the preferred example of implementation of an element of a structure according to this invention.
Figure 7:
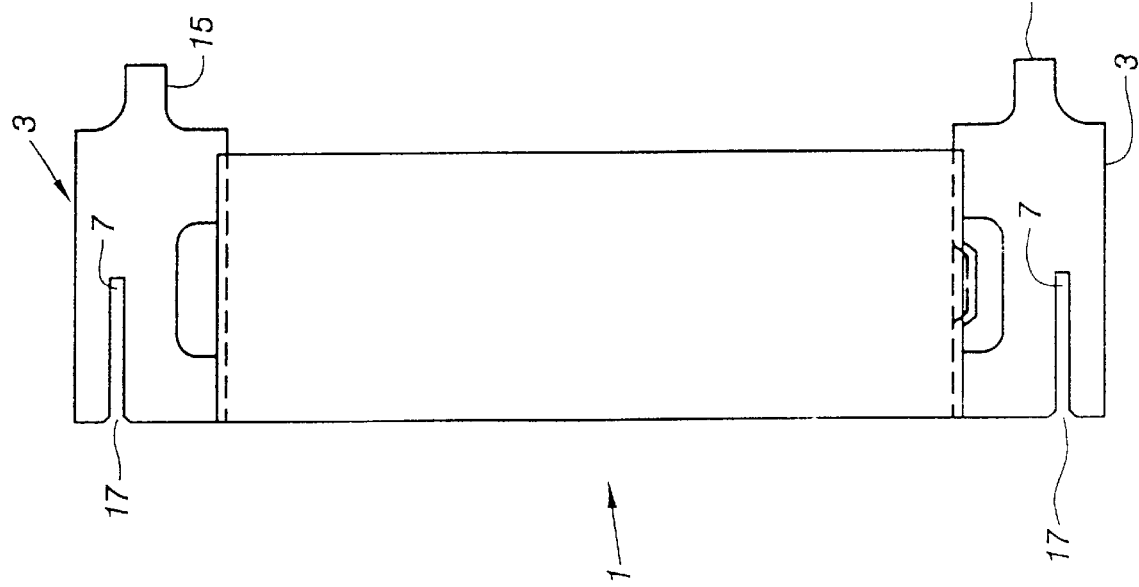
FIG. 7 is a side view of the element in FIG. 6 prior to the placement of a bottom.

The assembly according to this invention makes it possible, in particular, to make tools for the industrial cooking of hams. In FIGS. 6 and 7, one can see an element 1 constituting an individual receptacle for cooking hams. Although it does not have restrictive features of any kind, receptacle 1, as shown, has a base having the shape of an isosceles trapezium with rounded angles. This shape is called a "mandolin" shape and is particularly popular among Spanish consumers. However, it is understood that the use of the receptacle for the individual reception of hams to be cooked with different shapes—such as, for example, a parallelepipedic rectangle with rounded corners, with an oval base, with an elliptical base in the shape of a barrel or any other shape, the use of receptacles for the reception of a plurality of hams to be cooked, in particular, in the shape of an elongated channel with a flat or rounded bottom as well as receptacles for the cooking of other foods or having other shapes—do not exceed the scope of this invention.

In the illustrated nonrestrictive example, a first tab 3, equipped with a slot 5, extends perpendicularly in the middle of the other face of the short side of the isosceles triangle. Two other attachment tabs 3 extend perpendicularly to the outer face of the long side parallel to the short side of the isosceles triangle. These latter two tabs are advantageously arranged symmetrically with respect to a longitudinal symmetrical axis 9 of receptacle 1.

Figure 9:
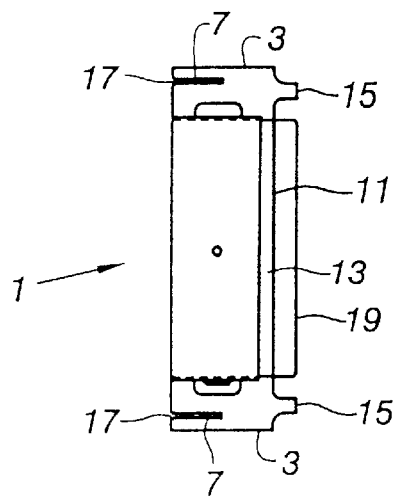
FIG. 9 is a side view of the element in FIG. 6 equipped with a bottom and a lid for an immediately lower element.

As one can see in FIG. 9, the vertical wall of each receptacle 1 advantageously does not reach its bottom 11, providing a space 13 for the flow of the cooking juices and/or the calorie-bearing fluids. In that case, it is advantageous to attach bottom 11 on tabs 3. For example, these tabs essentially have a rectangular shape with a height equal to the height of the wall of the receptacle increased by the width of space 13. This rectangle is extended downward by a rectangular tongue 15 having rounded angles for connection to the rectangle forming the rest of the tab. In an illustrated advantageous example, bottom 11 is integral on the level of tabs 3, and the contact surface extends from the internal face (vertical when in the user position) of tab 15 passing through the connection angle all the way to the lower face (when in the user position) of the approximately rectangular portion of tab 3. The soldering is advantageously done only on the level of the zone of lower horizontal contact of tabs 3.

In the example illustrated, slots 7 present a widened entry 17 facilitating assembly. Slots 7 in the example illustrated are pointed upward when in the user condition. Advantageously, each receptacle 1 is equipped with a lid. In the preferred example of implementation, each receptacle 1 is equipped on bottom 11 with a lid 19 that can be adapted to an identical receptacle arranged immediately below in a stack of cooking utensils according to this invention and stacked.

Figure 8:
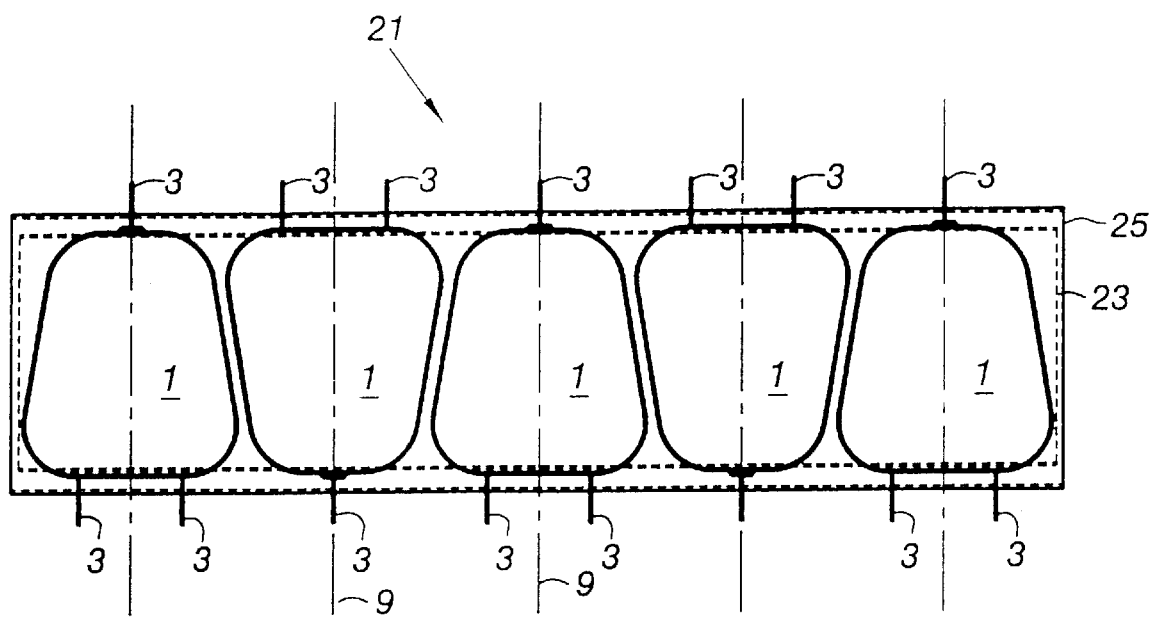
FIG. 8 is a plan view of the preferred example of implementation of a module of a structure according to this invention.

In FIG. 8, one can see a module 21 comprising five receptacles 1 from FIG. 6, two consecutive receptacles being mounted head to foot, assembled by means of two peripheral frames 23 and 25.

Figure 10:
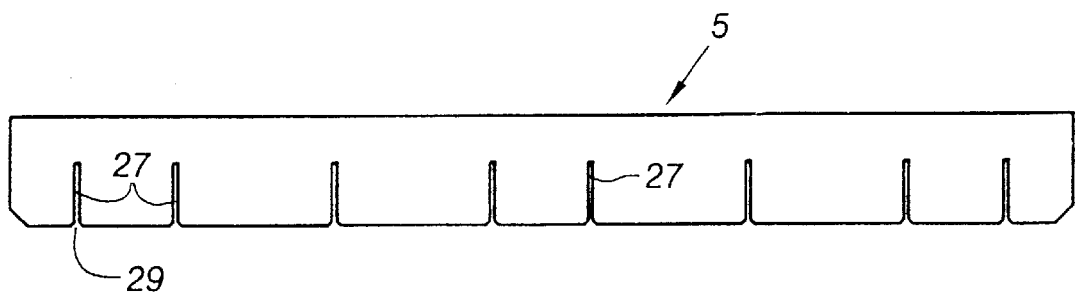
FIG. 10 is an elevation view of a transversal plate installed in a structure according to this invention.
Figure 11:
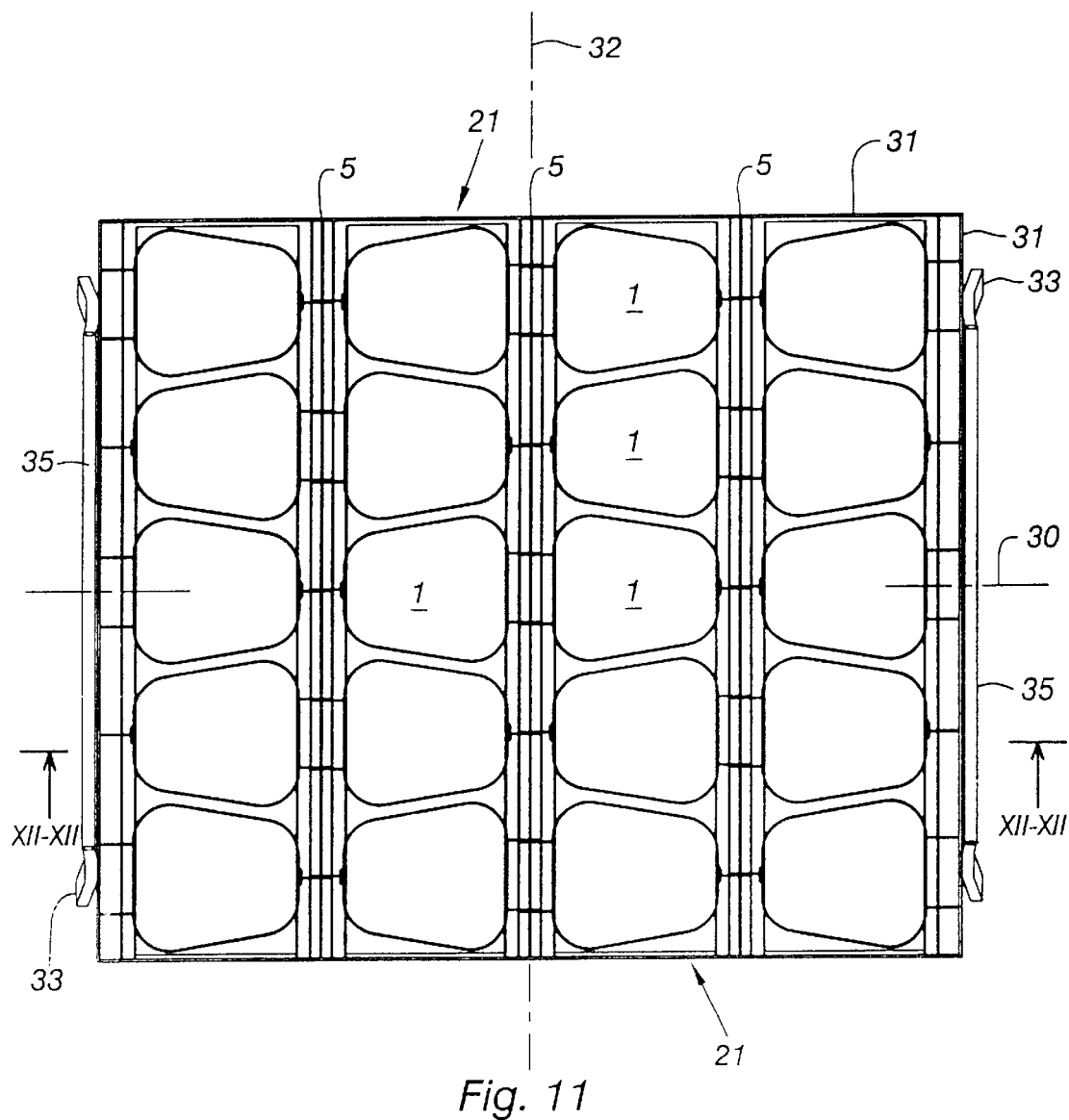
FIG. 11 is a plan view of the preferred example of implementation of a structure according to this invention.
Figure 12:
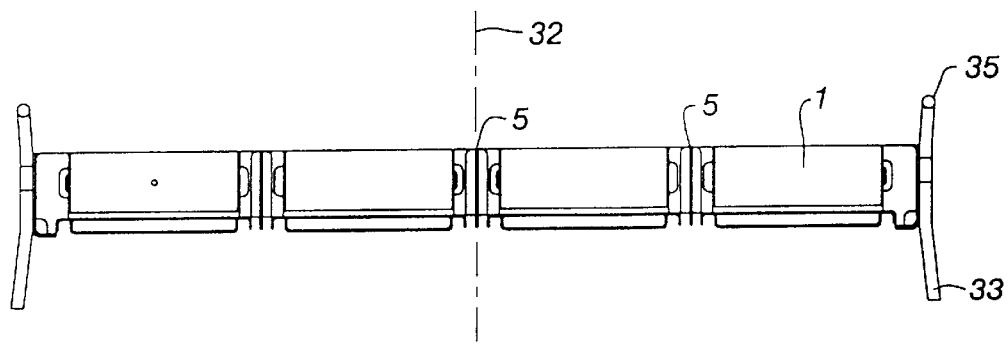
FIG. 12 is a profile view along line XII—XII in the structure given in FIG. 11.

In FIG. 10, one can see a transversal plate 5, permitting the assembly of elements 1 of FIGS. 6 to 7 and 9, or advantageously of modules 21 in FIG. 8. Sheet 5 has two slots 27 for the reception of tabs 3 on the level of the corresponding slots 7. In the example illustrated, transversal sheet 5 has eight slots 27 whose distribution corresponds to the distribution of tabs 3 on the face of module 21 illustrated in the lower of FIG. 8. The structure, according to this invention, furthermore comprises a second type of plate, featuring seven slots in places corresponding to tabs 3 on the face of module 21 illustrated in the upper portion of FIG. 8. Each slot has a width that corresponds to the sum of the thicknesses of tabs 3, which it is intended to receive, plus leeway, permitting their introduction. For example, for tabs 3, made in the form of an inoxidizable steel plate having a thickness of 3 millimeters, the grooves 27 advantageously have a thickness equal to 6.5 millimeters. Advantageously, the entries 29 of the grooves or slots 27 are widened toward the outside. For example, they comprise 3-millimeters pans cut at 45°. Slots 27 of plates 5 are pointed downward.

In FIGS. 11 to 15, one can see the preferred example of implementation of a structure according to this invention, constituting an industrial tool for cooking hams. This tool comprises four modules 21 that are assembled together with each other by three transversal plates 5. In the illustrated nonrestrictive example, this structure is provided with five end sheets 5, which are assembled, for example, by soldering on a peripheral frame 31. In such a case, tabs 3, pointed toward the outside of the cooking tool, are provided with slots or grooves.

It should be noted that the cooking implement is advantageously symmetrical with respect to a vertical longitudinal median plane 30 and with respect to a transversal vertical median plane 32. Thus, the cooking implement, illustrated in FIG. 11, does not change with respect to its center when it is rotated by 180°. In other terms, the lids of the upper receptacles are perfectly adapted to the lower receptacles even if one inverts one of the two cooking implements according to the invention by 180° with respect to a vertical axis.

The implements according to this invention are advantageously handled with the help of forklifts. Thus, at least the lower implement of a stack of implements comprises feet or similar devices that under receptacles 1 provide a passage space for the fork. Advantageously, each implement comprises soldered feet 33, for example, under the small side of the peripheral rectangular frame 31. As a non-illustrated variation, feet 33 are soldered on the long side of the rectangular peripheral frame 31. Advantageously, each assembly of feet, arranged on one side of the implement according to this invention, is connected in its upper portion when in the user position by a bar or pipe 35, facilitating the handling of the implement. Advantageously, feet 33 have a shape that is widened downward, facilitating the centering of the implements above each other during stacking.

The structures according to this invention will be made of materials offering the desired mechanical strength and compatibility with the uses contemplated. For example, for industrial hand cooking implements, one advantageously uses inoxidizable steel. The various elements are made by cutting and bending sheets and are assembled especially by soldering. The elements that must offer great precision such as, for example, the transversal sheets 5 in FIG. 10, are advantageously cut by laser.

Figure 13:
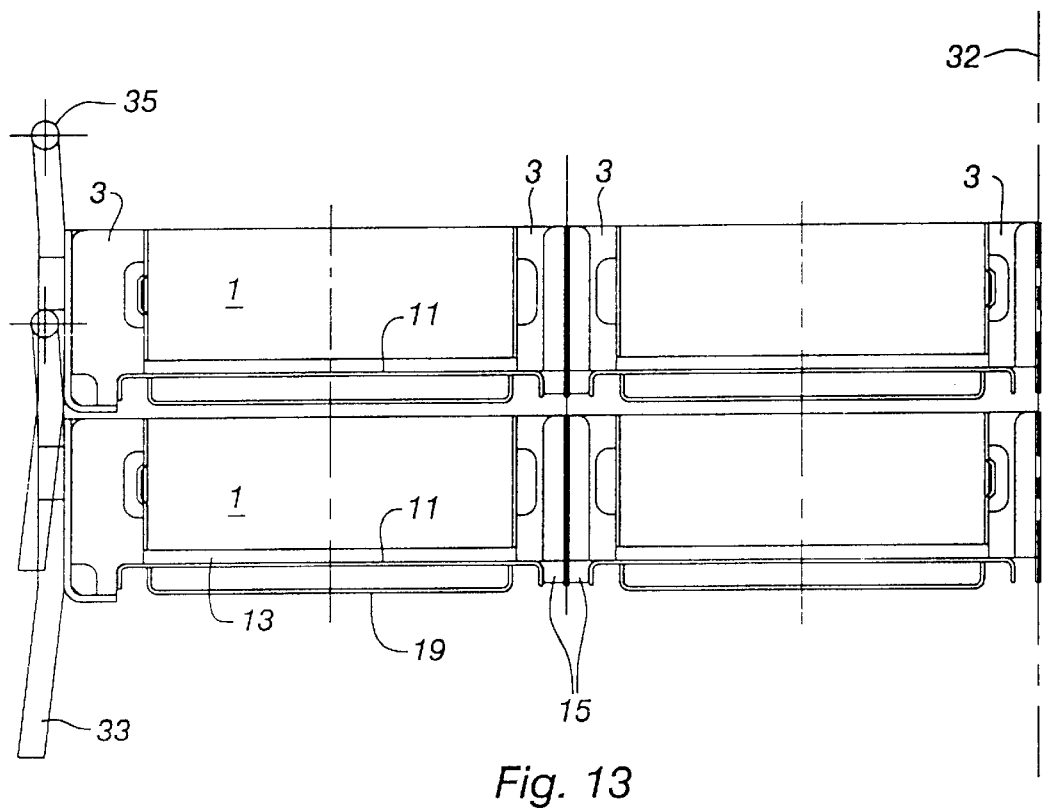
FIG. 13 is a similar partial view of FIG. 12 illustrating two structures stacked on top of each other.
Figure 14:
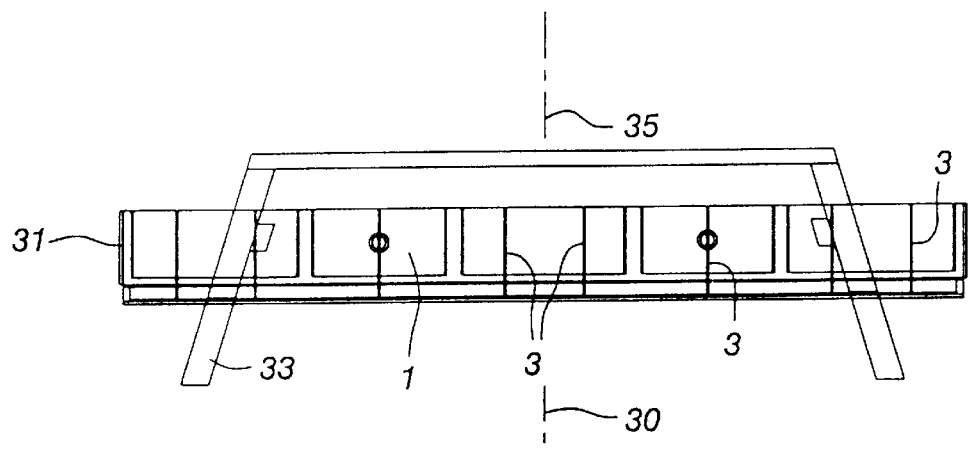
FIG. 14 is a front view of the structure in FIG. 11.
Figure 15:
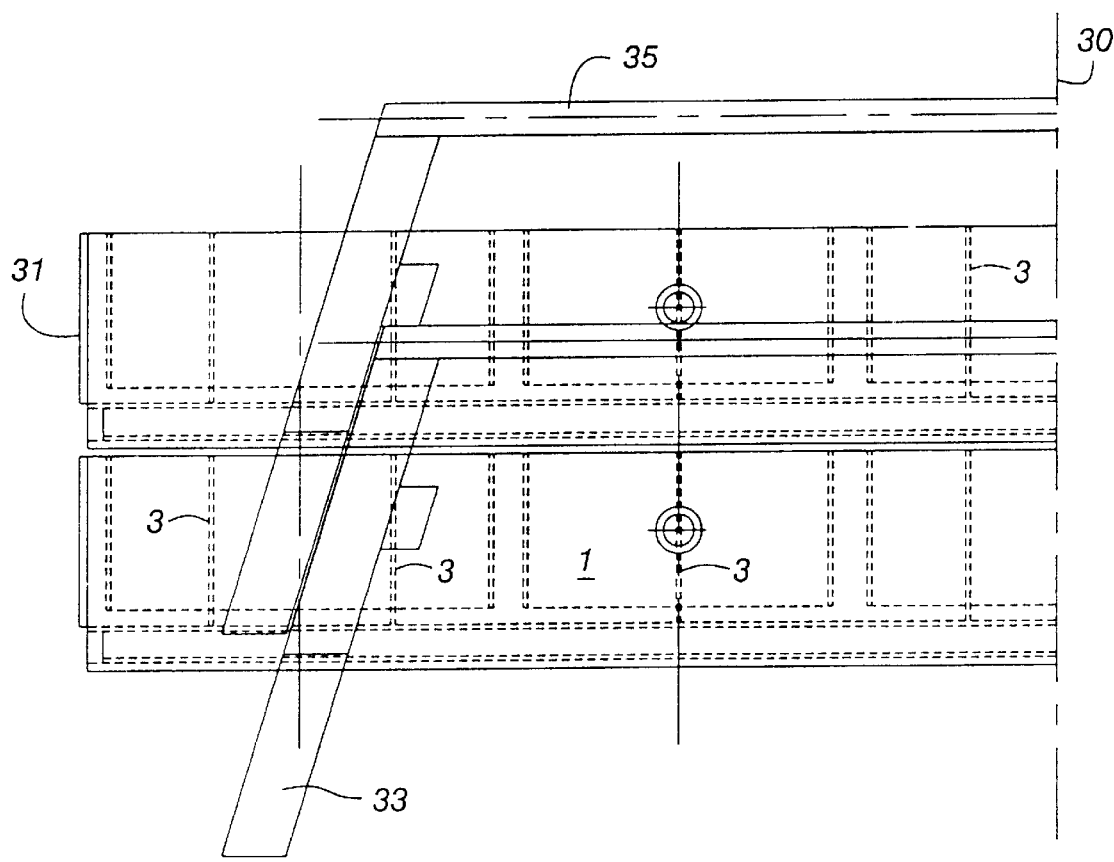
FIG. 15 is a similar partial view of FIG. 14 illustrating two structures according to this invention and stacked.

In the examples illustrated in FIGS. 13 and 15, lids 19 do not penetrate into the interior of the immediately lower receptacles 1. However, as a variant, the lids are arranged lower so as to penetrate into said immediately lower receptacles.

After the housing of slots 7 and 27, tabs 3 can be made integral with the transversal plates or beams 5, for example, by soldering or by means of hard solder.

This invention is applied particularly to the machine-building industry.

This invention is primarily applied to the agribusiness industry.

What is claimed is:

1. A rigid support structure comprising:

a plurality of beams having slots;

a plurality of holding elements having a plurality of tabs extending therefrom, each of said tabs including a slot complementary to said slots in said beams, said holding elements being mounted on said beams with said tab slots engaging said beam slots, wherein two tabs are received in at least one of said beam slots, and wherein said holding elements comprise at least a first tab that protrudes with respect to a first face of said holding element and a second tab that protrudes with respect to a second face of said holding element, opposite to said first face of said holding element.

2. A rigid support structure comprising:

a plurality of beams having slots;

a plurality of holding elements having a plurality of tabs extending therefrom, each of said tabs including a slot complementary to said slots in said beams, said holding elements being mounted on said beams with said tab slots engaging said beam slots, wherein two tabs are received in at least one of said beam slots, and wherein the holding elements are in the shape of an isosceles trapezium with rounded corners.

* * * * *